July 31, 1962  J. R. CLARKSON  3,047,008
VALVE

Filed May 24, 1957  2 Sheets-Sheet 1

INVENTOR
JOHN ROBERT CLARKSON

BY Strauch, Nolan & Neale
ATTORNEYS

July 31, 1962 J. R. CLARKSON 3,047,008
VALVE
Filed May 24, 1957 2 Sheets-Sheet 2

INVENTOR
JOHN ROBERT CLARKSON

BY *Strauch, Nolan & Neale*

ATTORNEYS

3,047,008
VALVE
John Robert Clarkson, Palo Alto, Calif., assignor, by mesne assignments, to The J. R. Clarkson Company, a corporation of California
Filed May 24, 1957, Ser. No. 661,488
8 Claims. (Cl. 137—315)

The present invention relates to improvements in valves and more particularly to improvements in valves of the type which will be herein referred to as radially contractible unobstructed venturi sleeve valves. These valves are used primarily in pipelines carrying solids suspended in liquid. This term is intended to refer to a valve providing an unobstructed substantially circular inlet port the diameter of which may be selectively varied to control flow between full flow and shut off while maintaining the port substantially circular over the major portion of such control range. An example of such a valve is disclosed in Swedish Patent No. 132,054 granted April 5, 1951 to C. D. Carlsson et al.

Valves of the type disclosed in said patent have many advantages over other types of valves, particularly for use in pipelines carrying fluids in which solids are suspended, in that they provide an unobstructed circular port in line with the pipe in which the valve is interposed and in that the size of flow metering port can be reduced substantially to cutoff while maintaining its circularity and concentricity with the pipe to control the rate of flow over a large portion of the range between full flow and cutoff with minimum head loss at the valve due to turbulence. This maintenance of port circularity over a wide range of flow is attributable primarily to the provision of a very thick annular wall at the central region in which the sleeve is contractible under the influence of externally applied fluid pressure about the circumference of the center portion of the sleeve. The design of the Swedish patent provided a one to one ratio between radial wall thickness and port diameter in that region to achieve this result. As distinguished from this type of operation, in a thin walled sleeve valve, the sleeve, at a very stage of closure, collapses to a non-circular configuration such as a figure eight for example with resultant turbulence and head loss.

Valves as disclosed in said Swedish patent have certain limitations which it is the primary object of this invention to eliminate. In such valves the sleeve is received within and substantially coextensive in length with the bore of a generally tubular central metal casing portion the ends of which are closed by metal end plates provided with annular bosses projecting within to support and clamp the reduced thickness ends of the sleeve. This arrangement, due to the frictional contact between the sleeve and the interior of the casing and exterior of the end plate bosses makes disassembly of the valve for replacement of the sleeve a very difficult and time consuming operation, particularly in the field. Further, in order to assure that the sleeve will always return to its initial fully open configuration after relief of the externally applied pressure when the valve has been set at fully or partially closed conditions for long periods of time, the sleeve as originally designed was made entirely of natural rubber or with a thin coating of synthetic rubber on its exterior. Natural rubber was used because of its ability to flow under proper pressure permitting the sleeve to close with a substantially round hole in the center of flow and because of its memory characteristics by which it will return to its original shape upon pressure release. In many applications, however, natural rubber may cause contamination of the material passing through the valve rendering use of a valve embodying natural or pure gum rubber exposed to line fluid impossible. A further limitation of said Swedish patented design resides in the fact that it is not practically adaptable to any but very small diameter pipe sizes, in the order of 1½ or 2" diameter port size. If a one to one ratio of port diameter to sleeve radial thickness is maintained in a 6" valve, for example, the overall diameter of the sleeve itself is 18". It would require nearly 400 p.s.i. pressure for closure and the total weight of the valve would exceed 1100 lbs. The high cost and unusual weight and bulkiness of such a valve makes it totally impractical. Experimentation has shown however that if the radial thickness of the sleeve wall is reduced to one half the port diameter, when the valve is put in operation and the sleeve subjected to a closing pressure as low as 20 to 25 p.s.i., one side begins to collapse and close in while the opposite side has very little movement. While such a valve is useful as an off-on valve, due to the noncircularity of the port over any extended range of applied closing pressure it is of little value as a control or throttle valve.

With the foregoing general consideration in view, the principal objects of the present invention are:

(1) To provide an improved radially contractible unobstructed venturi valve operable over a major portion of its range between full flow and cutoff while maintaining substantially the circularity of the port thereof in which the portion of the sleeve exposed to line fluid is inert and will not contaminate the line fluid, which is so constructed as to be readily disassembled for repair and replacement of the sleeve, and in which the relation between the full flow port diameter and sleeve wall radial thickness is such as to maintain the overall bulk and weight of the valve within acceptably small limits even for relatively large full flow port diameters;

(2) To provide an improved radially contractible unobstructed venturi valve embodying an annularly laminated sleeve having an inert bore wall which will not contaminate line fluids passing therethrough and which has flow and memory characteristics substantially equivalent to those of pure gum rubber to assure maintenance of port circularity during valve closure over the major portion of its range and restoration of the sleeve to its fully open configuration upon relief of the valve closing pressure;

(3) To provide an improved radially contractible unobstructed venturi valve of such improved construction that the contractible sleeve of such valve may be readily removed from the casing thereof for repair and replacement purposes;

(4) To provide an improved radially contractible unobstructed venturi valve embodying a sleeve having a contractible portion of such radial thickness relative to the full flow port diameter therethrough as to maintain the circularity of the port opening therethrough over the major portion of the control range between full flow and shut-off while maintaining the overall bulk and weight of the valve within acceptably low limits;

(5) To provide a radially contractible unobstructed venturi valve embodying a sleeve having a contractible portion in which the ratio of the full flow port diameter to the radial thickness of the sleeve at the contractible portion thereof is in the order of five to three; and (6) To provide a radially contractible unobstructed venturi valve embodying a sleeve having a contractible portion in which the ratio of the full flow port diameter to the radial thickness of the sleeve at such contractible portion is in the order of 5 to 2.79.

These and other objects of the present invention will become more fully apparent by reference to the appended claims and as the following detailed description proceeds in reference to the accompanying drawings wherein:

Figure 1:
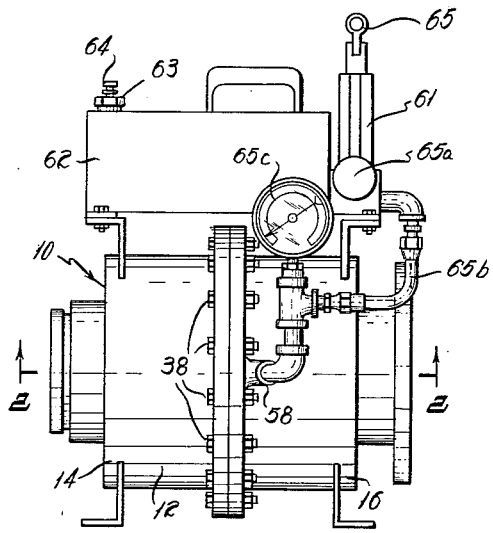
FIGURE 1 is a view in side elevation of a valve embodying the principles of the present invention.
Figure 2:
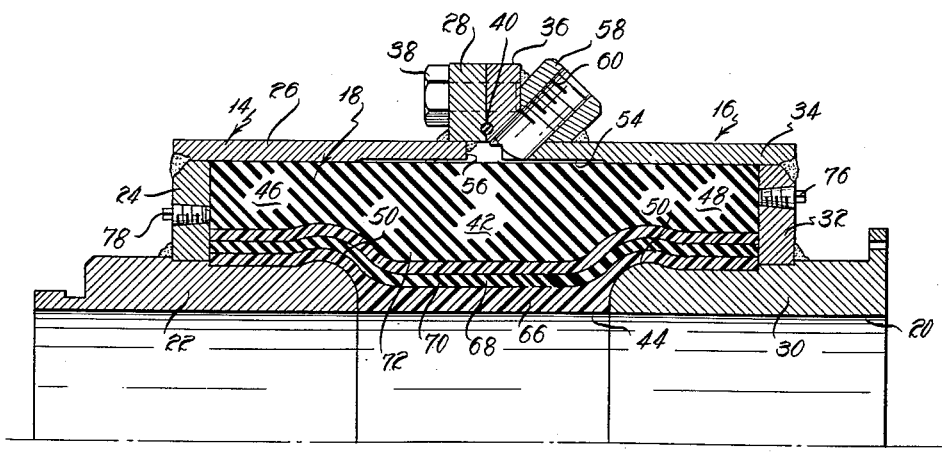
FIGURE 2 is a fragmentary section along the line 2—2 of FIGURE 1.

FIGURES 1 and 2 of the drawings illustrate a hydraulically or pneumatically actuated radially contractible unobstructed venturi sleeve valve assembly 10 embodying the principles of the present invention. The assembly 10 comprises a casing 12 formed of two parts 14 and 16, and a sleeve 18 housed and confined therein to define, in the relaxed condition of sleeve 18, a cylindrical through passage 20 which is preferably equal in diameter to the internal diameter of the pipe line in which the valve assembly 10 is interposed. Due to the unobstructed in line port arrangement, it has been found that in certain instances a port diameter smaller than the pipeline size is acceptable. For example, a 5" port valve in a 6" pipeline has so much less head loss than other types of valves, it is acceptable commercially with a venturi inlet and outlet.

Casing part 14 is a fluid tight welded unit and comprises an annular hub 22, a radial wall 24 extending outwardly from the exterior of the central portion of hub 22, a cylindrical wall 26 fixed to the periphery of radial wall 24 and extending toward the center of the valve concentric with hub 22, and a radial attachment flange 28 fixed to the other end of cylindrical wall 26. Casing part 16 is a fluid tight welded unit complementary to part 14 and similarly comprises an annular hub 30, a radial wall 32, a cylindrical wall 34 and a radial flange 36. The corresponding portions of casing parts 14 and 16 are identical. Casing parts 14 and 16 are assembled by a plurality of bolts 38 passing through aligned apertures in the abutting flanges 28 and 30, fluid tight relation between the flanges 28 and 36 being maintained by an O-ring 40 received in slightly compressed relation within mating circumferentially extending recesses of arcuate cross section in the abutting faces of flanges 28 and 36.

Figure 3:
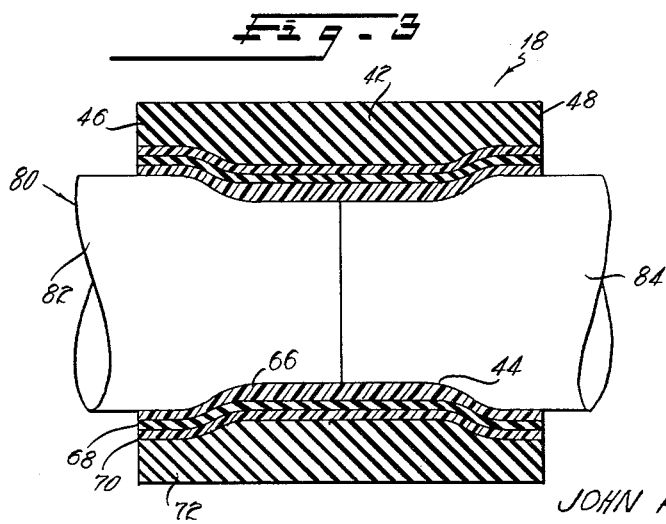
FIGURE 3 illustrates the structure and method of fabrication of the sleeve of the valve of FIGURE 1.

As is best illustrated in FIGURE 3, as fabricated, the sleeve 18 is an annulus having a central thick-walled cylinder portion 42 of substantial radial thickness in relation to the diameter of the opening port 44 therethrough, and annular extensions or attachment flanges 46 and 48 at each end thereof of lesser radial thickness and spaced radially outwardly from the bore of portion 42.

In assembly, as shown in FIGURE 2, the annular extension 46 is snugly received and fixed within the annular recess defined between exterior surface of hub 22 and the interior surface of the cylindrical wall 26, the region of extension 46 adjacent the central portion 42 being tightly compressed between the exterior of hub 22 and the interior surface of wall 26 by the radially outwardly projecting annular lip 50 on the inner end of the hub 22. The extension 48 is similarly received within the annular recess defined between the exterior surface of hub 30 and the interior surface of wall 16 and is compressed adjacent its juncture of portion 42 by the annular radially outwardly projecting lip 50 on the inner end of hub 30. The overall axial length of sleeve 18 is slightly greater than the axial spacing between the end walls of these two annular recesses so that sleeve 18 is subjected to a slight axial compression when the casing 12 is assembled as shown in FIGURE 2.

The internal diameter of cylindrical walls 26 and 34 at the region in which they surround the central portion 42 of the sleeve 18 is sufficiently greater than the outside diameter of the portion 42 of the sleeve 18 to define an annular chamber 54 about the central portion 42 of the sleeve 18 and the end faces of walls 26 and 34 are in axially spaced relation to define a further annular chamber 56 about the central portion 42 of sleeve 18 and in fluid communication with the chamber 54. Hydraulic or pneumatic fluid is introduced into the chamber 56 and into the chamber 54 through an attachment fitting 58 welded to the wall 34 and flange 36 in defining an inlet port 60.

Figure 4:
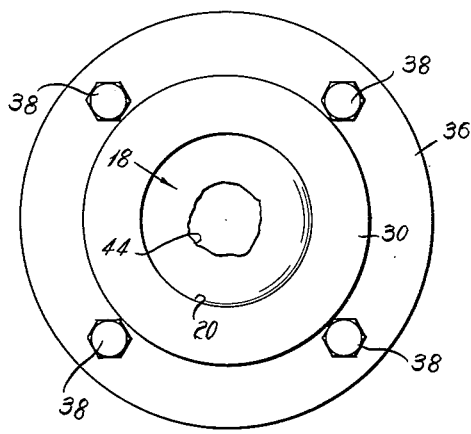
FIGURE 4 is an end view of the valve of FIGURE 1 with the valve partially closed.
Figure 5:
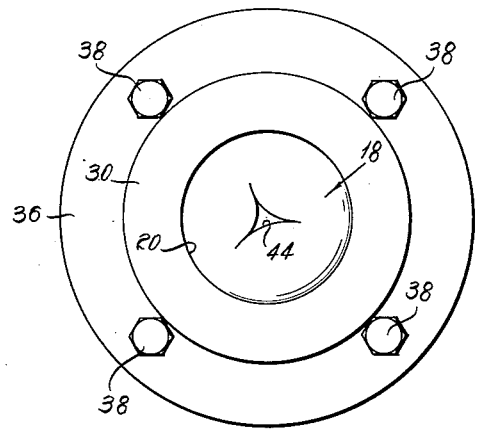
FIGURE 5 is an end view of the FIGURE 1 valve with the valve substantially completely closed.

In operation, fluid is introduced into the chambers 56 and 54 through inlet port 60 under pressure to apply a uniformly distributed radially inwardly directed pressure to the central thick-walled cylinder portion 42 of sleeve 18 about its entire circumference. Castor oil is preferred because of its compatibility with pure gum rubber. Hydraulic fluid such as castor oil is forced into the chambers 56 and 54 by means of a hydraulic pump 61 mounted on the top of casing 12 and supplied by a hydraulic fluid reservoir 62. The reservoir tank 62 is filled by removing cap 63 which has a closable air vent 64. The hydraulic pump 61 actuated by a reciprocal hand lever 65 forces hydraulic fluid from tank 62 when a valve (not shown) is opened by handle 65a through line 65b to port 60 and into the chambers 56 and 54. A gauge 65c in line 65b indicates the hydraulic pressure. The application of this radial pressure circumferentially about the central portion 42 will produce radial compression of the portion 42 and as the pressure is increased, gradually decrease the size of the cross sectional area of the opening 44 at the center of its longitudinal dimension. With the sleeve properly constructed as will be described in detail presently in accordance with the present invention, radial compression of the portion 42 may be affected over a major portion of the range between the full flow position of sleeve 18 as illustated in FIGURE 2 and its shut-off condition while maintaining circularity of the minimum diameter cross section of the opening 44 and providing a converging diverging passage for fluid in the form of a venturi opening. This is clearly shown in FIGURE 4. For example, if the diameter of opening 44 is 5 inches in its fully open condition of sleeve 18, the central portion 42 thereof can be radially compressed until the region of maximum convergence of the port 44 is reduced to a diameter of approximately 2 inches while maintaining the circularity of this region of maximum convergence. This represents a reduction in area of 84% of the port opening while maintaining circularity of the region of maximum convergence. When the central portion 42 is further compressed beyond this condition, it will rapidly collapse from its circular configuration to a fully cut-off condition. FIGURE 5 illustrates one manner in which the sleeve 18 may collapse toward its fully closed condition. As pressure is relieved within the chambers 56 and 54, the reverse operation occurs. That is, as the pressure is relieved, the central portion 42 of the sleeve 18 will expand and assume the circularity of its port when the pressure is relieved to provide a rapid opening to approximately 16% of the full flow open area of the port 44 and will gradually increase as the pressure is relieved providing a circular venturi opening of gradually increasing diameter. This construction provides an effective control range between a maximum area and approximately 16% of that maximum area. This range is entirely adequate for practically all control installations.

The primary factor in providing this mode of operation, is the relationship between the diameter of the port 44 at the fully relaxed condition of sleeve 18 and the radial thickness of the central portion 42. In the preferred structure for a valve in which the through port has a diameter of 5 inches, the radial thickness of the central portion 42 will be 2.79 inches. It has been shown by experimentation that the minimum value for the radial thickness of the portion 42 in relation to the diameter of the port 44 is quite critical. If the radial thickness of the portion 42 is made equal to one-half the fully open diameter of port 44, the circularity of the port 44 will be lost under very low pressures within the chambers 56 and 54, in the order of 20 to 25 pounds per square inch. A ratio in the order of 5 to 3 or 5 to 2.79 between the full flow diameter of port 44 and the radial thickness of the portion 42 has been found to produce optimum results in that substantial circularity of the port opening is maintained from full flow down to a reduction of the minimum cross section of the venturi to approximately 16% of the full flow area while maintaining circularity and in that it maintains the overall external diameter of the sleeve 18 only slightly in excess of twice the diameter of the port opening 44, thereby assuring relatively low bulk, weight and cost.

As was pointed out at the outset hereof, in many installations, the line fluid passing through a valve of this type will be contaminated if the sleeve 18 is formed of pure gum rubber or gum rubber with a thin exterior layer of synthetic rubber as contemplated by the aforesaid Swedish patent. It is essential however that the major portion of the sleeve 18 be formed of pure gum rubber and provide the necessary flowability of the body material of sleeve 18 during its radial compression and to provide the memory and resilience of the sleeve 18 to restore it to its initial condition providing a full open port upon relief of the pressure within chambers 56 and 54. In order to overcome the disadvantages of the prior art, while maintaining the memory and flowability characteristics of the sleeve 18, I have provided a novel annularly laminated sleeve consisting of successive layers 66, 68, 70 and 72. Layer 66 which is exposed to line fluid is formed of a resilient inert material, preferably 100% neoprene rubber, the outer and major layer 72 is formed of 100% pure gum rubber. Layer 68, which is bonded to the exterior of layer 66 is formed predominantly of neoprene rubber with a proportion of pure gum rubber intermixed therewith, and layer 70 intermediate layers 68 and 72 and bonded to each is formed predominantly of gum rubber with the remainder neoprene rubber. The preferred percentages in layers 68 and 70 are respectively: neoprene 77%, gum 23% and neoprene 23%, gum 77%. By this construction, a sleeve 18 having an inert inner layer 66 defining the surface of port 44 to prevent contamination of line fluid and having a body predominantly formed of gum rubber and intermediate layer providing a gradual transition between the characteristics of neoprene rubber and pure gum rubber by the provision of successive layers of intermixed neoprene and pure gum rubbers in which each successive radially outer layer has a greater proportion of pure gum rubber than the immediately adjacent inner layer.

The mode of fabrication of sleeve 18 is illustrated in detail in FIGURE 3. FIGURE 3 of the drawing illustrates a mode of manufacture of rubber bushing 18. By way of example, the bushing is described as having a 5 inch internal diameter at the central portion 42. Layer 66 is formed by wrapping a 11 5/16 inches wide and 1/4-inch thick ply of pure neoprene rubber around a diametrally split steel mandril 80, the halves of which are designated 82 and 84. Another ply is added to this to bring the thickness at the ends to 1/2 inch. Additional plies are added to the center or shoulder portion 42 to bring the total thickness in this portion up to 1 inch. Next a 1/4 inch ply of 11 5/16 inches wide rubber sheet comprising 77% neoprene and the remainder gum rubber is applied to the top of the layer 66 to form layer 68. Following this another ply of 77% gum rubber and the remainder neoprene is applied to form layer 70 and is followed by multiple plies of pure gum rubber to form layer 72 and bring the total outside diameter of the rubber bushing 18 up to 10 3/16 inches. A core (not shown) is placed around the assembled layers and heated to fuse all of the rubber into a unitary bushing 18.

As was described above, the annular extensions 46 and 48 of the sleeve 18 must be firmly clamped and confined by the casing halves 14 and 16 in order to prevent any movement thereof other than the stretching of the body material thereof to assure that the sleeve 18 will return to its initial configuration is illustrated in FIGURE 2. This fact, in prior art structures, has made it extremely difficult to remove the sleeve from the casing.

In order to overcome this problem, the casing 10 has been formed by two parts which are separable intermediate the ends of sleeve 18, preferably at the center thereof. Disassembly of this valve may be effected by removing the bolts 38 about the flanges 28 and 40, and removing the plugs 76 and 78 from the radial walls 32 and 24 respectively. A screw fitting may then be inserted within the opening for plugs 76 and 78 and a source of air pressure connected first to one and then the other by suitable coupling hose. When air is applied through the opening for plugs 76, air acts upon the radial end face of extension 48 and forces it from the annular recess defined between hub 30 and cylindrical walls 16 in much the same manner that an annular piston would be moved through an annular chamber. The extension 46 may be similarly forced from the annular recess defined by hub 22, cylindrical wall 26 and radial wall 24 by the application of air pressure through the opening for plug 78.

It is thus apparent that by removing the bolts 38, and applying air pressure through the openings for plugs 76 and 78, the sleeve 18 may be readily disassembled from the casing halves 14 and 16 to permit removal of sleeve 18 for its replacement, reversal end for end or for other purposes.

The centrally split casing 12 has a further advantage in that the casing parting plane and the casing pressure chambers are completely isolated by sleeve 18 from the line fluid so that contamination of either the line fluid by the pressure fluid or vice versa or leakage of line fluid from the casing is impossible.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A valve comprising a tubular elastomeric structure defining a radially contractible flow passage, a casing for said structure, means securing the ends of said tubular structure in fixed axially spaced relation in said casing, and selectively operable means for subjecting an annular central portion of said structure to uniform radial compression to constrict the size of the opening through said tubular structure at said central portion, said casing being formed of two separable parts, the parting surfaces of which extend transversely of the longitudinal dimension of said tubular structure and lie intermediate its end, said casing being provided with means by which fluid pressure can be selectively exerted axially against at least one end of said tubular elastomeric structure to forcibly eject said structure from said casing upon disassembly thereof.

2. The valve defined in claim 1 wherein the parting surfaces between the two parts of said casing lie in a plane substantially midway between the ends of said tubular structure.

3. A valve assembly comprising a first annular body of resilient flexible wear resistant inert material defining an unobstructed fluid passage of circular cross-section, a casing surrounding said body, means securing the end regions of said body to said casing in fixed and fluid tight relation thereto, a second annular body secured at its opposite ends in said casing in concentric surrounding relation to at least a central portion of said first body, said first and second annular bodies being operatively interconnected to flex circumferentially together as a unit, said second annular body having an exterior central portion in circumferentially spaced relation to the interior of said casing to define with said casing an annular fluid chamber about the central portion of said second body and into which fluid under pressure can be introduced to apply a circumferentially uniform radial compressive force to said second body to radially compress said bodies to constrict the opening through said first body, said second body being of substantially greater radial wall thickness at the region thereof adjacent the longitudinal center thereof than the wall thickness of said first body at the portion thereof within said second body central portion and of sufficient radial wall thickness to permit substantial radial compression thereof without distortion of the cross-sectional configuration thereof, said second body being of sufficient resilience to restore both the first and second annular bodies to their initial configuration upon relief of the pressure within said chamber, and said casing having a fluid port therethrough opening at one end into said chamber to permit controlled ingress and egress of fluid under pressure to and from said chamber.

4. The valve assembly defined in claim 3 wherein said first annular body is formed of synthetic rubber.

5. The valve assembly defined in claim 4 wherein the synthetic rubber of which said first annular body is formed is neoprene rubber.

6. The valve assembly defined in claim 3 wherein said second annular body is formed of pure gum rubber.

7. A valve comprising an annular tubular resilient sleeve structure defining an unobstructed longitudinally extending fluid passage, a casing surrounding said sleeve structure and defining with a central peripheral portion thereof an annular fluid chamber, means fixing the axially spaced end regions of said sleeve structure relative to said casing in fluid tight relation, and means defining a fluid passage through said casing opening into said chamber to permit controlled ingress and egress of fluid into and from said chamber to control the externally applied circumferential pressure on said sleeve structure to thereby control the constriction of the passage therethrough, said casing comprising a pair of opposed annular parts detachably interconnected in fluid tight relation and having a parting plane extending transversely to the longitudinal axis of said passage and disposed substantially midway between the ends of said sleeve, each of said end regions of said sleeve structure being force-fitted into a respective casing part, said casing being provided with means by which fluid pressure can be selectively exerted axially against at least one end of the said sleeve structure to forcibly eject said sleeve structure from said casing upon disassembly thereof.

8. The valve recited in claim 7 wherein said annular fluid chamber forms a relatively thin band of circumferentially uniform radial dimension in any plane transverse to the longitudinal axis of said sleeve structure about the central peripheral portion of said sleeve structure and wherein a selectively actuatable source of fluid is connected to said fluid passage opening to said chamber to permit controlled ingress and egress of fluid into and from said annular fluid chamber.

References Cited in the file of this patent

UNITED STATES PATENTS

| | | | |
|---|---|---|---|
| 2,093,092 | McElhany | Sept. | 14, 1937 |
| 2,430,934 | Kemmler et al. | Nov. | 18, 1947 |
| 2,590,215 | Sausa | Mar. | 25, 1952 |
| 2,627,874 | Johnson | Feb. | 10, 1953 |
| 2,633,154 | Eastman | Mar. | 31, 1953 |
| 2,654,559 | Franck | Oct. | 6, 1953 |
| 2,715,085 | Boger | Aug. | 9, 1955 |
| 2,725,211 | Bateler | Nov. | 29, 1955 |
| 2,748,042 | Borgese | May | 29, 1956 |
| 2,748,461 | Ohlsson | June | 5, 1956 |
| 2,876,937 | Wilson | Mar. | 10, 1959 |
| 2,904,063 | Wall | Sept. | 15, 1959 |

FOREIGN PATENTS

| | | | |
|---|---|---|---|
| 670,327 | Germany | | of 1939 |
| 132,054 | Sweden | June | 19, 1951 |
| 698,188 | Great Britain | | of 1953 |

UNITED STATES PATENT OFFICE
CERTIFICATE OF CORRECTION

Patent No. 3,047,008                         July 31, 1962

John Robert Clarkson

It is hereby certified that error appears in the above numbered patent requiring correction and that the said Letters Patent should read as corrected below.

Column 1, line 41, after "very" insert -- early --.

Signed and sealed this 20th day of November 1962.

(SEAL)
Attest:

ERNEST W. SWIDER
Attesting Officer

DAVID L. LADD
Commissioner of Patents